(12) United States Patent
Maker et al.

(10) Patent No.: US 11,347,130 B2
(45) Date of Patent: May 31, 2022

(54) NONLINEAR CRYSTAL

(71) Applicant: M SQUARED LASERS LIMITED, Glasgow (GB)

(72) Inventors: Gareth Thomas Maker, Glasgow (GB); Graeme Peter Alexander Malcolm, Glasgow (GB)

(73) Assignee: M Squared Lasers Limited, Glasgow (GB)

(*) Notice: Subject to any disclaimer, the term of this patent is extended or adjusted under 35 U.S.C. 154(b) by 89 days.

(21) Appl. No.: 16/616,143

(22) PCT Filed: May 22, 2018

(86) PCT No.: PCT/GB2018/051377
§ 371 (c)(1),
(2) Date: Nov. 22, 2019

(87) PCT Pub. No.: WO2018/215748
PCT Pub. Date: Nov. 29, 2018

(65) Prior Publication Data
US 2021/0286229 A1 Sep. 16, 2021

(30) Foreign Application Priority Data

May 23, 2017 (GB) ..................................... 1708263

(51) Int. Cl.
*G02F 1/355* (2006.01)
*G02F 1/35* (2006.01)
*H01S 3/00* (2006.01)

(52) U.S. Cl.
CPC .......... *G02F 1/3509* (2021.01); *G02F 1/3501* (2013.01); *G02F 1/353* (2013.01);
(Continued)

(58) Field of Classification Search
CPC ...... G02F 1/3505; G02F 1/3509; G02F 1/353; G02F 1/3551
See application file for complete search history.

(56) References Cited

U.S. PATENT DOCUMENTS 5,363,388 A * 11/1994 Shi ........................ G02F 1/3534
372/20
5,574,740 A 11/1996 Hargis et al.
(Continued)

FOREIGN PATENT DOCUMENTS

CN 105428988 A 3/2016
EP 2887136 A1 2/2018
(Continued)

OTHER PUBLICATIONS

International Search Report from PCT/GB2018/051377 dated Sep. 27, 2018.
UK Search and Examination Report dated Oct. 27, 2017.

*Primary Examiner* — Daniel Petkovsek
(74) *Attorney, Agent, or Firm* — FisherBroyles, LLP

(57) ABSTRACT

A nonlinear crystal comprising a first end face and an opposing second end face is described. The first and second end faces are separated along an optical axis of the nonlinear crystal by a length in the range of 0.25 mm and 2 mm. Although the length of the nonlinear crystal results in a reduction in the nonlinear effects induced on an optical field propagating through the crystal it also provides for reduced deviation experienced by the generated optical field when the nonlinear crystal is rotated. Therefore, when the nonlinear crystals are incorporated within an enhancement cavity their reduced length allows for the deviation of the output field to be minimised by servo control electronics arranged to adjust a single cavity mirror. This significantly reduces the
(Continued)

complexity, and thus expensive of the servo control electronics when compared to those employed with the prior art enhancement cavities.

21 Claims, 6 Drawing Sheets

(52) U.S. Cl.
CPC .......... *G02F 1/3505* (2021.01); *G02F 1/3551* (2013.01); *H01S 3/0092* (2013.01)

(56) References Cited

U.S. PATENT DOCUMENTS

| | | |
|---|---|---|
| 5,802,086 A | 1/1998 | Hargis et al. |
| 5,999,547 A * | 12/1999 | Schneider .................. G02F 1/39 372/21 |
| 6,358,243 B1 * | 3/2002 | Esterowitz ............. A61B 18/20 606/10 |
| 6,711,184 B1 | 3/2004 | Holleman et al. |
| 6,882,465 B1 * | 4/2005 | Boulanger ............ G02F 1/3501 359/326 |
| 8,717,665 B2 * | 5/2014 | Gerbier ................. G02F 1/3501 359/326 |
| 10,890,824 B2 * | 1/2021 | Maker ....................... G02F 1/37 |
| 2005/0141572 A1 | 6/2005 | Kasai |
| 2007/0258688 A1 | 11/2007 | Clubley et al. |
| 2011/0058248 A1 | 3/2011 | Vodopyanov et al. |
| 2014/0261955 A1 | 9/2014 | Kadokura et al. |
| 2015/0260572 A1 * | 9/2015 | Malcolm ................ H01S 3/117 250/338.1 |

FOREIGN PATENT DOCUMENTS

| | | |
|---|---|---|
| WO | WO1989/12922 A1 | 12/1989 |
| WO | WO2009/018491 A1 | 2/2009 |

* cited by examiner

NONLINEAR CRYSTAL

This application is the U.S. National Stage of International Application No. PCT/GB2018/051377, which was filed on May 22, 2018. This application also claims the benefit of the filing date of GB patent application No. 1708263.7, which was filed on May 23, 2017. The contents of both of those applications are hereby incorporated by reference.

The present invention relates to the field of nonlinear optics and in particular to a new nonlinear crystal design that finds particular application within a frequency mixing cavity.

BACKGROUND TO THE INVENTION

The nonlinear optical properties of crystals have been exploited for many years to mix photons of one or more optical fields in order to generate an output optical field at a desired known frequency or wavelength.

An example of such a process is sum-frequency mixing (SFM). This technique is based on the annihilation of two input photons at angular frequencies $\omega_1$ and $\omega_2$ to generate one photon at frequency $\omega_3$. Sum-frequency generation is a parametric process meaning that the photons satisfy energy conservation, leaving the matter unchanged, as defined by equation (1) below:

$$\hbar \omega_3 \approx \hbar \omega_1 + \hbar \omega_2 \quad (1)$$

wherein $\hbar = h/2\pi$
and h represents Planck's constant

For sum-frequency mixing to occur efficiently, the condition, as defined by equation (2), referred to as phase-matching, must be satisfied:

$$\hbar k_3 \approx \hbar k_1 + \hbar k_2 \quad (2)$$

where $k_1$, $k_2$ and $k_3$ are the angular wavenumbers of the three waves as they travel through the medium. As this condition is satisfied more and more accurately, the sum-frequency generation becomes more and more efficient. Also, as sum-frequency generation occurs over a longer and longer length, the phase-matching must become more and more accurate.

A special case of SFM is second-harmonic generation (SHG) in which $\omega_1 = \omega_2$. This is possibly the most common type of SFM. This is because in SHG, only one input field is required, as compared with SFM, where if $\omega_1 \neq \omega_2$, and thus two simultaneous input fields are needed which can be more difficult to arrange.

As an alternative process to SFM known in the art is difference frequency mixing (DFM). This is a nonlinear process that involves combining two photons of different energies to produce a third photon whose energy equals the difference between those of the incident photons, as defined by equation (3) below:

$$\hbar \omega_3 \approx \hbar \omega_1 \times \hbar \omega_2 \quad (3)$$

wherein $\hbar = h/2\pi$
and h represents Planck's constant

For DFM to occur efficiently the following phase-matching condition as defined by equation (4) must be satisfied:

$$\hbar k_3 \approx \hbar k_1 - \hbar k_2 \quad (4)$$

where $k_1$, $k_2$ and $k_3$ are again the angular wavenumbers of the three waves as they travel through the medium.

Other frequency mixing processes known in the art include third harmonic mixing (THM), high harmonic generation (HHG) and optical parametric amplification (OPA) and down conversion.

In order for the above described nonlinear effects to be of a sufficient level, crystal manufacturers typically produce nonlinear crystal with height, width and length dimensions in the range of 2 to 6 mm (height, H), 2 to 6 mm (width, W) and 3 mm to 30 mm (length, L). The area of the end faces of these crystals (i.e. the H×W) is known as the crystal aperture.

When choosing a nonlinear crystal for a system, a choice of what crystal cut to employ has also to be made i.e. how the end faces of the nonlinear crystal will be cut. Generally, there are two different cuts employed in the art for nonlinear crystals: a right-angle cut 1, as presented schematically in FIG. 1(a), and a Brewster-angle cut 2, as presented schematically in FIG. 1(b). Axes are provided within FIG. 1 to assist with clarity of understanding.

The right-angle cut nonlinear crystal 1 of FIG. 1(a) has its polished end faces 3 and 4 perpendicular to the optical axis 5 of the nonlinear crystal 1 while the Brewster-angle cut nonlinear crystal 2 of FIG. 1(b) has its faces 6 and 7 located at Brewster's angle (β) between the normal vector 8 of the polished faces 6 and 7 and the optical axis 5. At Brewster's angle (β), the surface reflectance of faces 6 and 7 is zero for the light with polarization inside the plane defined by the x and y axes (also defined as p-polarized light). The length (L) of the right-angle cut nonlinear crystal 1 and the Brewster-angle cut nonlinear crystal 2 are typically around 10 to 12 mm.

Although right-angle cut nonlinear crystals 1 are generally easier to manufacture than Brewster-angle cut nonlinear crystals 2, their use leads to higher transmission losses. These losses are increased when the right-angle cut nonlinear crystals 1 are employed with an optical resonator, as is often the case. For this reason, anti-reflective, high reflection or partial reflecting coatings are often applied to the polished end faces 3 and 4. Right-angle cut nonlinear crystals 1 are however more limited in their use within high power, especially short-pulse, applications since the coatings applied to the crystal 1 usually have lower damage thresholds than the uncoated end faces 6 and 7 of the Brewster-angle cut crystals 2.

As with any second order $\chi^{(2)}$, or higher order, phenomenon in nonlinear optics, the nonlinear processes can only occur under certain predefined conditions e.g. the light is interacting with matter, which is non-centro-symmetric and the input fields have a very high intensity (typically generated by a laser source). The phase matching requirements of equations (2) and (4) means that the frequency, or wavelength, of the generated output fields can be changed by the coordinated tuning of both the wavelength of the input field and the position of the nonlinear medium. Changing the position of the nonlinear medium is typically achieved by rotation or translation of the nonlinear crystal within the input fields.

By way of example, FIG. 2 presents a schematic representation of an enhancement cavity frequency doubler, depicted generally by reference numeral 9, that incorporates Brewster-angle cut crystal 2. The applicant's proprietary SolsTis® ECD-X is a suitable example of such an enhancement cavity frequency doubler 9. As can be seen from FIG. 2, the Brewster-angle cut crystal 2, which may, for example, be formed from BBO (Beta barium borate ($BaB_2O_4$)) or LBO (Lithium triborate ($LiB_3O_5$)), is located within a ring cavity defined by a first mirror 10, an output coupler 11 an input coupler 12 and a second mirror 13. The enhancement cavity frequency doubler 9 uses resonant enhancement to convert the output frequency of a continuous-wave, narrow linewidth laser source 14, such as a continuous-wave Ti:Sapphire laser, to produce a frequency doubled output field 15.

Frequency tuning of the output field 15 generated by the enhancement cavity frequency doubler 9 can be achieved by tuning the wavelength of the input field 14 and rotating the Brewster-angle cut crystal 2 about axis 16 to allow maintenance of the phase-matching condition of equation (2). In the presently described example, the Brewster-angle cut crystal 2 lies substantially within the plane defined by the x and y axes while the axis of rotation 16 also lies in this plane and forms an acute angle with the y axis.

As is known in the art, when rotation of a nonlinear crystal 1 or 2 is employed within a frequency tuning process a corresponding deviation of the propagation direction of the optical field exiting the nonlinear crystal 1 or 2 is experienced. This deviation is due to the effects of refraction within the nonlinear crystal 1 or 2. This deviation of the output field 15 is problematic to the development of commercial resonator based devices, since it requires automated realignment to be incorporated into the design of these systems.

One solution known in the art is to incorporate an optical plate within the resonator cavity that is controlled by servo control electronics to automatically rotate in a manner to compensate for the deviation introduced by rotation of the nonlinear crystal 1 or 2. Such solutions however have the disadvantage that they result in an increase in the internal optical losses within the resonator cavity and an increase in the losses experienced by the light generated by the nonlinear process. These solutions also act to increase the overall footprint of the system.

An alternative solution, as employed by the enhancement cavity frequency doubler 9 of FIG. 2, is to employ servo control electronics (not shown) to automatically realign each of the cavity mirrors 10, 11, 12 and 13 as the Brewster-angle cut crystal 2 is rotated. Although a good solution to the problem of beam deviation, the employment of such servo control electronics requires the employment of expensive motor based technology that results in a system that is significantly more complex, and thus more expensive, than those above described solutions based on incorporating an additional optical plate within the resonator cavity.

SUMMARY OF INVENTION

It is therefore an object of an embodiment of the present invention to obviate or at least mitigate the foregoing disadvantages of the methods and apparatus known in the art for tuning the frequency of the output field generated by a nonlinear crystal.

According to a first aspect of the present invention there is provided a nonlinear crystal comprising a first end face and an opposing second end face, the first and second end faces being separated along an optical axis of the nonlinear crystal by a length in a range of 0.25 mm to 2.5 mm.

The first and second end faces define a height and a width (H×W) of the nonlinear crystal i.e. the crystal aperture (H×W) while the separation of the first and second end faces defines a length (L) of the nonlinear crystal. Although the length of the nonlinear crystal results in a reduction in the nonlinear effects induced on an optical field propagating through the crystal it also provides for reduced deviation experienced by the generated optical field when the nonlinear crystal is rotated.

Preferably the first and second end faces are separated along the optical axis of the nonlinear crystal by a length in a range of 0.75 mm to 1.5 mm.

Most preferably the first and second end faces are separated along the optical axis of the nonlinear crystal by a length of 1 mm.

The nonlinear crystal may comprise a right-angle cut nonlinear crystal. In this embodiment, anti-reflective coatings may be applied to the first and or second end faces in order to enhance the non-linear operation of the nonlinear crystal 17.

Alternatively, the nonlinear crystal comprises a Brewster-angle cut nonlinear crystal.

Preferably a height of the nonlinear crystal is in a range of 2 to 8 mm.

Preferably a width of the nonlinear crystal is in a range of 2 to 8 mm.

The nonlinear crystal may be formed from BBO (Beta Barium Borate ($BaB_2O_4$)); LBO (Lithium Triborate ($LiB_3O_5$)); Lithium Iodate ($LiIO_3$); Lithium Niobate ($LiNbO_3$); Potassium Niobate ($KNbO_3$); KDP (Monopotassium Phosphate ($KH_2PO_4$)); Gallium Selenide (GaSe); or KTP (Potassium Titanyl Phosphate ($KTiOPO_4$)).

According to a second aspect of the present invention there is provided an enhancement cavity frequency doubler comprising one or more nonlinear crystals in accordance with the first aspect of the present invention.

Preferably the enhancement cavity frequency doubler comprises a ring cavity defined by three or more mirrors.

Most preferably the enhancement cavity frequency doubler comprises servo control electronics employed to rotate the nonlinear crystal in response to a wavelength tuning of an input optical field.

Most preferably a first mirror of the enhancement cavity frequency doubler comprises a first piezo stack. Most preferably the servo control electronics controls the first piezo stack to realign the first mirror to compensate for deviation of an output field resulting from the rotation of the nonlinear crystal. Preferably the first mirror comprises an output coupler for the enhancement cavity frequency doubler.

Optionally a second mirror of the enhancement cavity frequency doubler comprises a second piezo stack. Most preferably the servo control electronics controls the second piezo stack to realign the second mirror to compensate for deviation of an output field resulting from the rotation of the nonlinear crystal. Preferably the second mirror comprises an input coupler for the enhancement cavity frequency doubler.

Optionally the enhancement cavity frequency doubler further comprises a translation stage upon which the one or more nonlinear crystals are located. Operation of the translation stage allows for the enhancement cavity frequency doubler to interchangeably select between two or more nonlinear crystals thus providing the enhancement cavity frequency doubler with greater operational flexibility.

Embodiments of the second aspect of the invention may comprise features to implement the preferred or optional features of the first aspect of the invention or vice versa.

According to a third aspect of the present invention there is provided an enhancement cavity frequency mixer comprising a nonlinear crystal in accordance with the first aspect of the present invention.

Embodiments of the third aspect of the invention may comprise features to implement the preferred or optional features of the first or second aspects of the invention or vice versa.

According to a fourth aspect of the present invention there is provided a method of producing a nonlinear crystal comprising processing a bulk crystal to provide a nonlinear crystal comprising a first end face and an opposing second end face, the first and second end faces being separated along an optical axis of the nonlinear crystal by a length in a range of 0.25 mm to 2.5 mm.

Preferably the processing of the bulk crystal comprises one or more processing procedures selected from the group of processing procedures comprising cutting, shaping and polishing.

Embodiments of the fourth aspect of the invention may comprise features to implement the preferred or optional features of the first aspect of the invention or vice versa.

BRIEF DESCRIPTION OF DRAWINGS

There will now be described, by way of example only, various embodiments of the invention with reference to the drawings, of which.

Figure 1A:
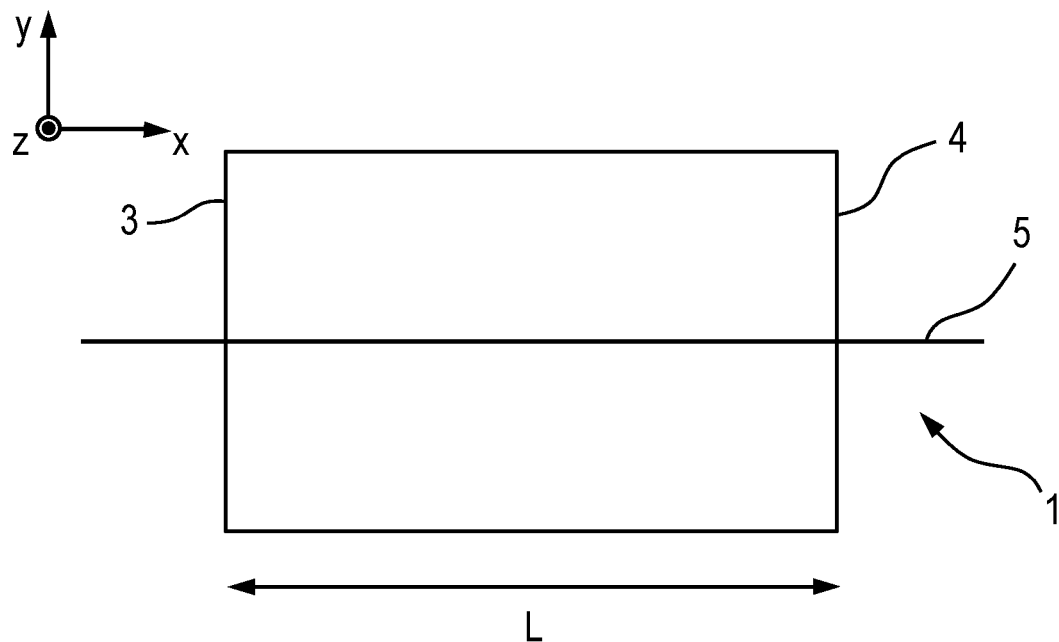
FIG. 1 presents: (a) a schematic representation of a right-angle cut nonlinear crystal known in the art; and (b) a schematic representation of a Brewster-angle cut nonlinear crystal known in the art.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

FIG. 3 presents schematic representations of two nonlinear crystals 17 and 18 in accordance with embodiments of the present invention. The described nonlinear crystals 17 and 18 may be formed from BBO (Beta Barium Borate ($BaB_2O_4$)); LBO (Lithium Triborate ($LiB_3O_5$)); Lithium Iodate ($LiIO_3$); Lithium Niobate ($LiNbO_3$); Potassium Niobate ($KNbO_3$); KDP (Monopotassium Phosphate ($KH_2PO_4$)); Gallium Selenide (GaSe); KTP (Potassium Titanyl Phosphate ($KTiOPO_4$)) or other known nonlinear material. Axes have again been provided within these figures for ease of reference with the x-axis being aligned with the optical axis of the described nonlinear crystal 17 and 18.

Figure 3A:
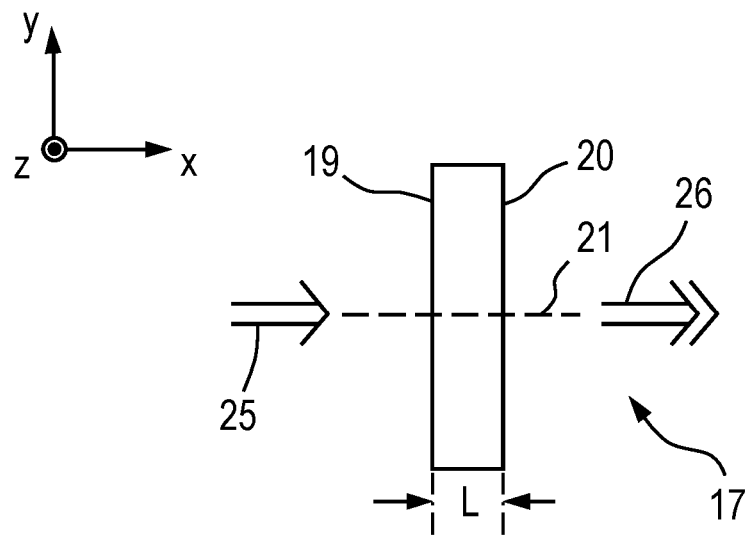
FIG. 3 presents: (a) a schematic representation of a right-angle cut nonlinear crystal in accordance with an embodiment of the present invention; and (b) a schematic representation of a Brewster-angle cut nonlinear crystal in accordance with an embodiment of the present invention.
Figure 3B:
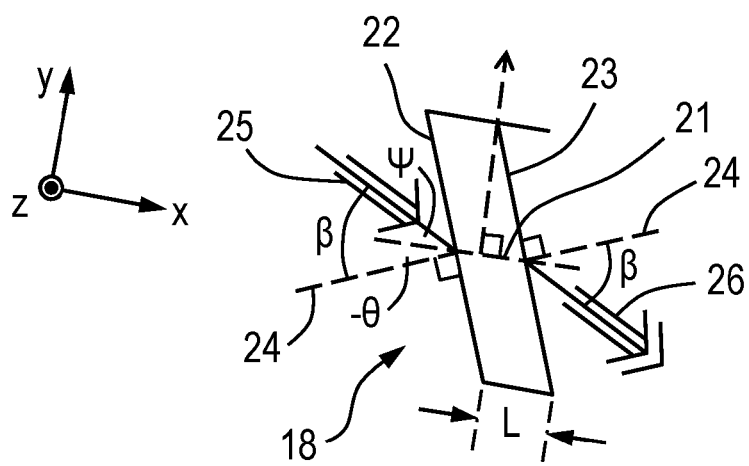

In particular, FIG. 3(a) presents a right-angle cut nonlinear crystal 17 (i.e. it has its polished end faces 19 and 20 perpendicular to the optical axis 21 of the nonlinear crystal 17) while FIG. 3(b) presents and a Brewster-angle cut nonlinear crystal 18 (i.e. it has its end faces 22 and 23 located at Brewster's angle ($\beta$) between the normal vector 24 of the polished faces 22 and 23 and the optical axis 21. At Brewster's angle ($\beta$), the surface reflectance of faces 22 and 23 is zero for the light with polarization inside the plane defined by the x and y axes (also defined as p-polarized light).

Figure 1B:
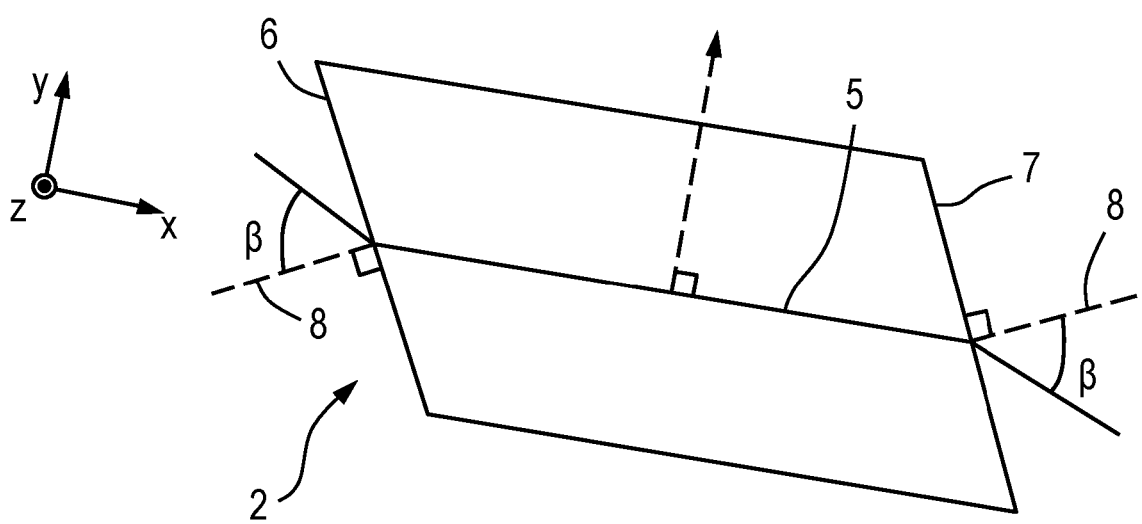

The main difference between the nonlinear crystals 17 and 18 of FIG. 3 and those described above with reference to FIG. 1 is the dimensions of the nonlinear crystals 17 and 18 and in particular their length (L). In the presently described embodiments, the nonlinear crystals 17 and 18 have a crystal aperture of 8×4 $mm^2$ (H×W) but have a length (L) of 1 mm. This length is a factor of ten smaller than the corresponding dimension for most commercial nonlinear crystals 1 and 2 known in the art (generally around 10 to 12 mm) and thus generates an output optical field having a power of around 25% of the known nonlinear crystals 1 and 2. It is counterintuitive to the teachings of the prior art to reduce the length (L) of the nonlinear crystals 17 and 18 in such a manner since this reduction leads to a corresponding reduction of the nonlinear effects induced on an optical field propagation through the crystals 17 and 18.

It will be appreciated by the skilled reader that the dimensions of the nonlinear crystals 17 and 18 may vary from the specific dimensions described above with reference to FIG. 3. The applicants have found that a number of the following described advantages of the nonlinear crystals 17 and 18 can still be achieved when the length (L) of the nonlinear crystal 17 and 18 lie in the range of lies in the range of 0.25 mm to 2.5 mm. A length of 0.25 mm is the lower limit of the crystal length that still provides an output optical field of sufficient power, and the crystal with sufficient physical strength, for its use within a commercial enhancement cavity frequency doubler. Preferably, the length L of the nonlinear crystal 17 and 18 lies in the range of 0.75 mm to 1.5 mm. In all of these embodiments, the height (H) and width (W) of the nonlinear crystal 17 and 18 may lie in the range of 2 to 6 mm.

It will be appreciated that anti-reflective coatings may be applied to the first 19 and or second 20 end faces in order to enhance the non-linear operation of the nonlinear crystal 17.

In FIG. 3(a), a fundamental optical field 25 at 800 nm, having a linear polarisation parallel to the y-axis of the nonlinear crystal 17, is shown incident upon the first end face 19 of the nonlinear crystal 17 so as to propagate along the optical axis 21 (x-axis) of the nonlinear crystal 17. The nonlinear properties of the crystal 17 result in the generation of a second harmonic optical field 26 at 400 nm exiting the nonlinear crystal 17 via the second end face 20. The second harmonic optical field 26 has a linear polarisation parallel to the z-axis.

It will be appreciated that a similar result occurs for the nonlinear crystal 18 of FIG. 3(b) when the fundamental optical field 25 at 800 nm, and having a linear polarisation in the x-y plane is incident upon the first end face 22 of the nonlinear crystal 18 at an angle of $\Psi$ with the optical axis 5 (x-axis). The angles $-\vartheta$ and $\Psi$ are chosen such that:

$$|\vartheta|+|\Psi|=\beta \qquad (5)$$

where $\beta$ again represent Brewster's angle.

With this arrangement, when the fundamental optical field 25 propagates along the optical axis 21 (x-axis) of the nonlinear crystal 18, the nonlinear properties of the crystal 18 result in the generation of a second harmonic optical field 26 at 400 nm exiting the nonlinear crystal 18 via the second end face 23. The second harmonic optical field 26 has a linear polarisation parallel to the z-axis.

As described above, frequency tuning of the second harmonic optical field 26 can be achieved by tuning the wavelength of the fundamental optical field 25 and rotating the nonlinear crystal 17 about y-axis, or the nonlinear crystal 18 about an axis of rotation to allow for maintenance of the desired phase-matching condition. Since the nonlinear crystals 17 and 18 have a length (L) significantly smaller than those nonlinear crystals known in the art, the generated second harmonic optical field 26 is lower in power than those generated by these known nonlinear crystals. This reduced power output within the generated second harmonic optical field 26 can however be compensated for by locating the nonlinear crystal 17 or 18 within an enhancement cavity, as will now be described with reference to FIGS. 4 and 5.

Figure 2:
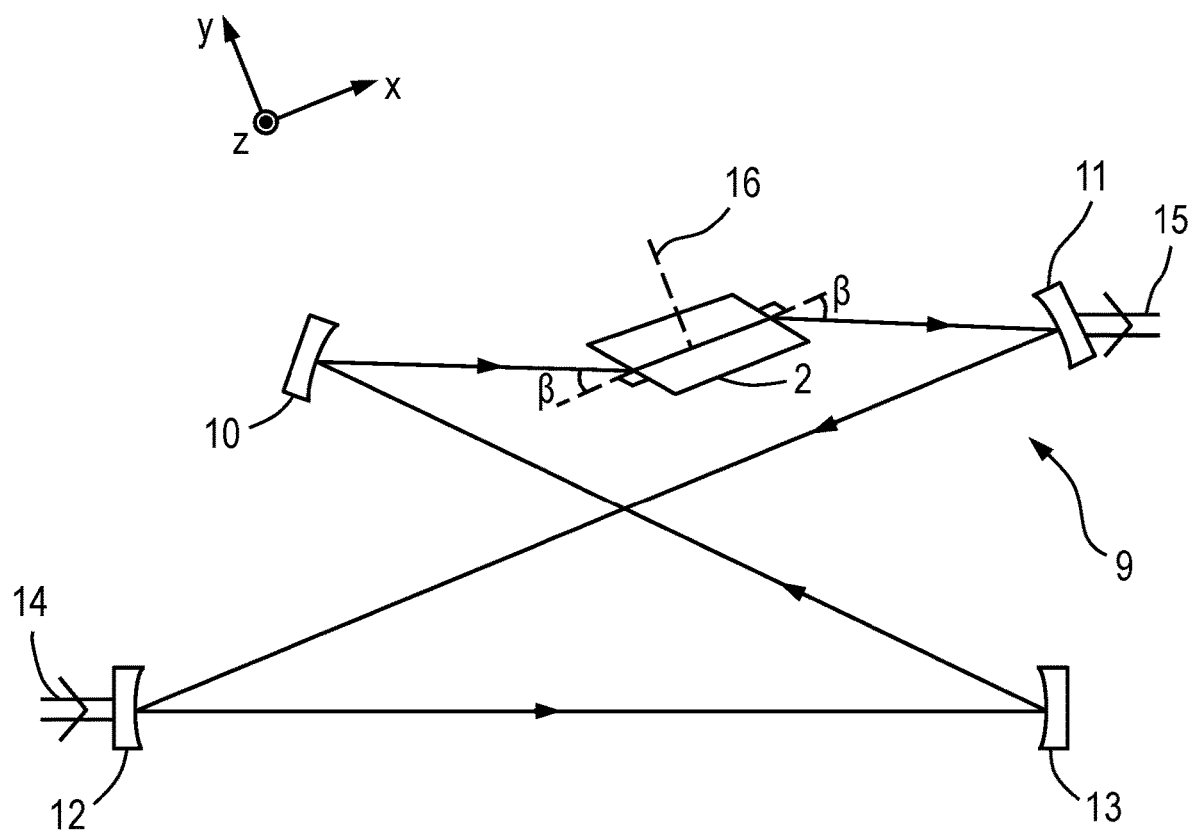
FIG. 2 presents a schematic representation of an enhancement cavity frequency doubler known in the art.
Figure 4:
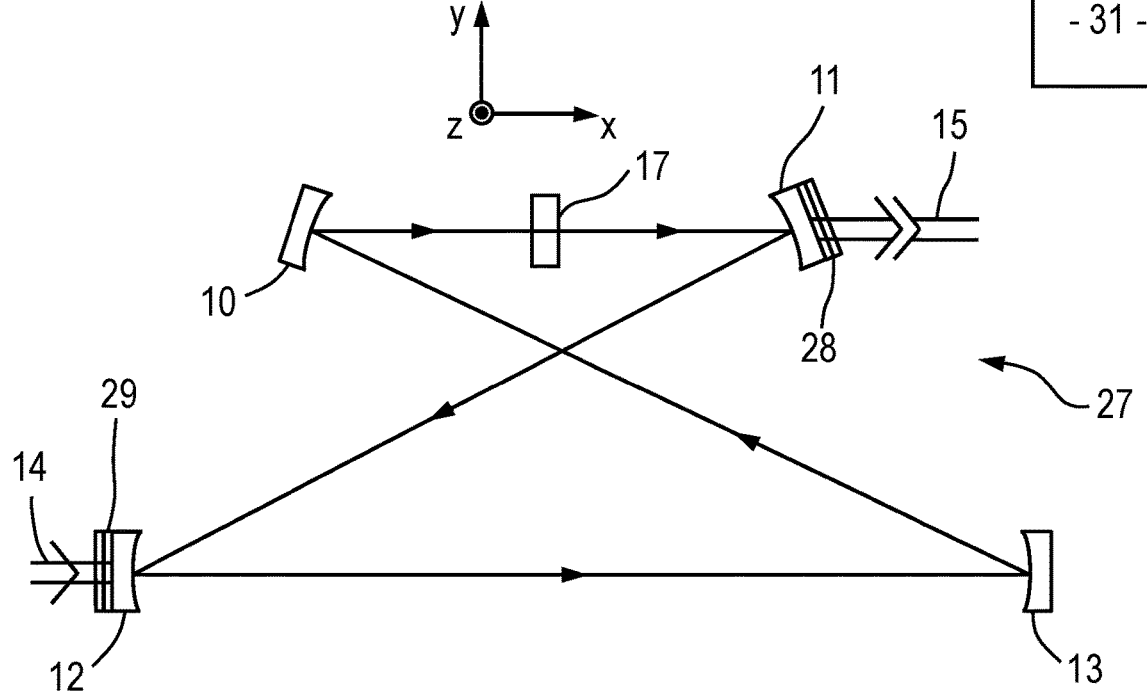
FIG. 4 presents a schematic representation of an enhancement cavity frequency doubler incorporating the nonlinear crystal of FIG. 3(a)

FIG. 4 presents a schematic representation of an enhancement cavity frequency doubler, depicted generally by reference numeral 27, that incorporates the nonlinear crystal 17 of FIG. 3(a). In a similar manner to the enhancement cavity frequency doubler 9 as described above with reference to FIG. 2, the nonlinear crystal 17 is located within a ring cavity defined by a first mirror 10, an output coupler 11 an input coupler 12 and a second mirror 13. A first piezo stack 28 provides a means for spatially adjusting the orientation of the output coupler 11. A second piezo stack 29 may also be included to provides a means for spatially adjusting the orientation of the input coupler 12.

Figure 5:
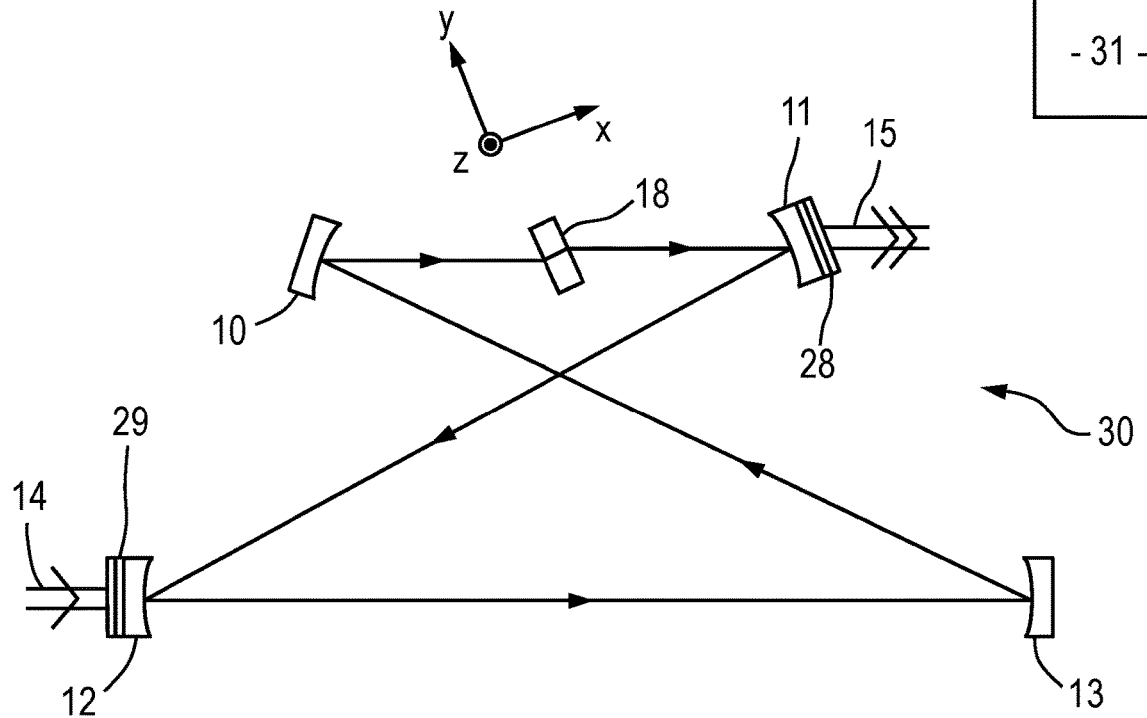
FIG. 5 presents a schematic representation of an enhancement cavity frequency doubler incorporating the nonlinear crystal of FIG. 3(a)

FIG. 5 presents a schematic representation of a similar enhancement cavity frequency doubler, depicted generally by reference numeral 30, that incorporates the nonlinear crystal 18 of FIG. 3(b). The nonlinear crystal 18 is again located within a ring cavity defined by a first mirror 10, an output coupler 11 an input coupler 12 and a second mirror 13. The first piezo stack 28 again provides a means for spatially adjusting the orientation of the output coupler 11 while the second piezo stack 29 may also be included to provide a means for spatially adjusting the orientation of the input coupler 12.

The enhancement cavity frequency doublers 27 and 30 again use resonant enhancement to convert the output frequency of a continuous-wave, narrow linewidth laser source 14, such as a continuous-wave Ti:Sapphire laser, to produce a frequency doubled output field 15.

Servo control electronics, depicted generally by reference numeral 31, are employed to rotate the nonlinear crystals 17 and 18 in response to the wavelength tuning of the input field 14. As will be appreciated by the skilled reader, it is also necessary to introduce a mechanism for compensating for deviation of the output field 15 resulting from the rotation of the nonlinear crystals 17 and 18. In the enhancement cavity frequency doublers 27 and 30 this is achieved by employing the first piezo stack 28 within a feedback loop of the servo control electronics 31. The first piezo stack 28 thus automatically realigns the output coupler 11 to minimise the levels of deviation introduced to the output field 15. In practice, only adjustment of the output coupler 11 about the y-axis is required to minimise deviation that would otherwise be introduced to the output field 15.

It has proved beneficial for the operation of some embodiments of the enhancement cavity frequency doublers 27 and 30 to also employing the second piezo stack 29 within a feedback loop of the servo control electronics 31. The second piezo stack 29 thus automatically realigns the input coupler 12 to further assist in minimising the levels of deviation introduced of the output field 15. In practice, only adjustment of the input coupler 12 about the y-axis is required to achieve this improved minimisation of the deviation of the output field 15.

It is a result of the relatively thin nonlinear crystals 17 and 18 that allows for the deviation of the output field 15 to be minimised by the servo control electronics 31 adjusting just a single mirror, or in some embodiments two mirrors, of the enhancement cavity frequency doublers 27 and 30. This significantly reduces the complexity, and thus expensive of the servo control electronics 31 when compared to those employed with the prior art enhancement cavity frequency doubler 9 presented in FIG. 2 where all four cavity mirrors cavity mirrors 10, 11, 12 and 13 are required to be monitored and adjusted.

The employment of the nonlinear crystals 17 and 18 within the enhancement cavity frequency doublers 27 and 30 provides a good balance between the reduced efficiency exhibited by the nonlinear crystals 17 and 18 (i.e. the power of the output field 15 generated by the nonlinear process) when compared to the nonlinear crystals known in the art, and the level of deviation induced upon of the output field 15 that is required to be compensated for by the servo control electronics 31. As a result, deviation of the output field 15 can be compensated for by employing piezo technology rather than the more expensive motor based technology required for known enhancement cavity frequency doublers 9. This can be achieved by the adjustment of only one, or two mirrors, rather than adjustment of all of the mirrors of the enhancement cavity frequency doubler 9.

Figure 6:
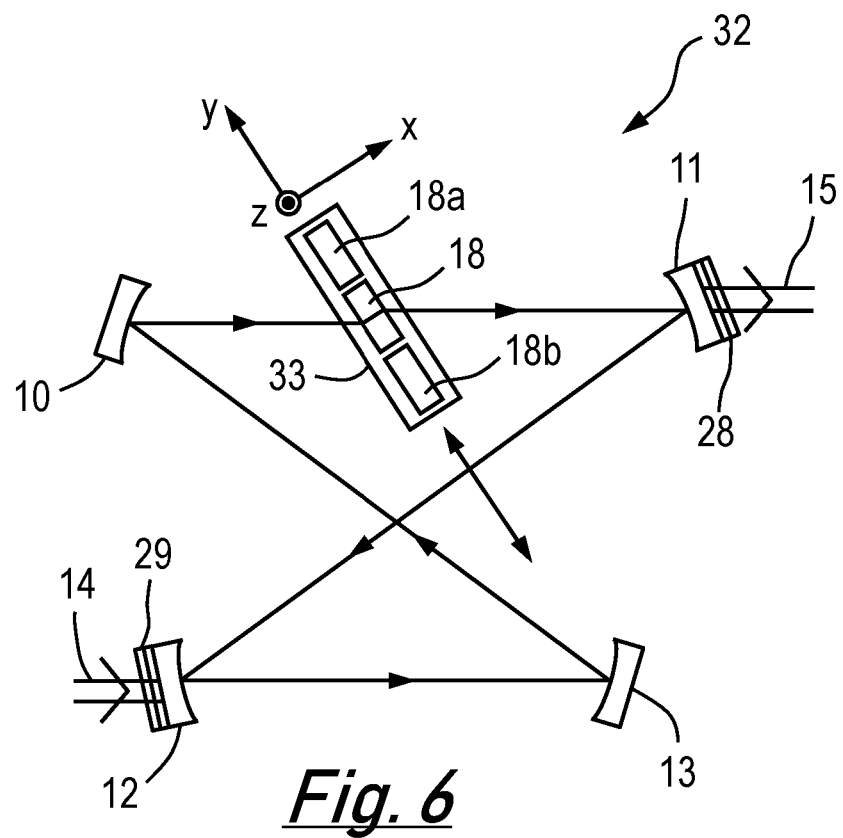
FIG. 6 presents a schematic representation of an enhancement cavity frequency doubler incorporating three nonlinear crystals of the type presented in FIG. 3(b)

FIG. 6 presents a schematic representation of an alternative enhancement cavity frequency doubler, depicted generally by reference numeral 32, that incorporating three nonlinear crystals 18, 18a and 18b each of the type presented in FIG. 3(b). In FIG. 6, the nonlinear crystal 18 is located within a ring cavity defined by a first mirror 10, an output coupler 11 an input coupler 12 and a second mirror 13. The first piezo stack 28 again provides a means for spatially adjusting the orientation of the output coupler 11 while the second piezo stack 29 may also be included to provide a means for spatially adjusting the orientation of the input coupler 12. The nonlinear crystals 18, 18a and 18b are however mounted upon a translation stage 33, the operation of which may be controlled by the servo control electronics 31. The arrangement allows for the enhancement cavity frequency doubler 32 to interchangeably select between the three nonlinear crystals 18, 18a and 18b by translation movement along the y-axis, thus providing the enhancement cavity frequency doubler 32 with greater operational flexibility. For example, the nonlinear crystals 18, 18a and 18b can be chosen to generate an output field at different wavelengths thus increasing the wavelength range over which the enhancement cavity frequency doubler 32 can operate.

Figure 7:
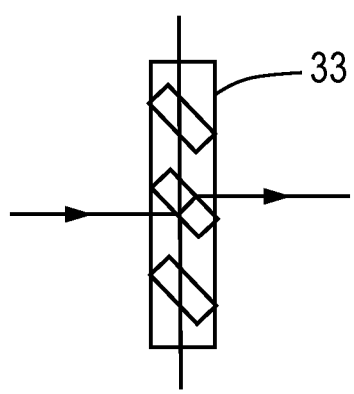
FIG. 7 presents an alternative arrangement for a translation stage of the enhancement cavity frequency doubler of FIG. 6.

It will be further appreciated that the orientation of the translation stage 33 within the enhancement cavity frequency doubler 32 may be altered from that presented in FIG. 6. For example, FIG. 7 presents an alternative arrangement wherein the translation stage 33 is arranged to translate the nonlinear crystals 18, 18a and 18b in a direction substantially perpendicular to the circulating optical field of the enhancement cavity frequency doubler 32. In further alternative embodiments, the translation stage may be rotational rather than linear. It may be beneficial to adopt such an arrangements to reduce the footprint of the device and or to avoid the nonlinear crystals 18, 18a and 18b not being used for frequency doubling interfering with the operation of other components of the enhancement cavity frequency doubler 32.

Although the above described enhancement cavity frequency doublers are based on second harmonic generation nonlinear mixing processes it will be apparent to the skilled reader that the described nonlinear crystals may be employed with other frequency mixing systems that employ other nonlinear processes known in the art including: more general sum frequency mixing (SFM); difference frequency mixing (DFM); third harmonic mixing (THM); high harmonic generation (HHG); and optical parametric amplification (OPA) and down conversion.

Furthermore, the above described embodiments employ a four-mirrored ring cavity structure. It will however be appreciated by the skilled reader that alternative ring cavity designs may be employed e.g. designs based on three or more mirrors.

It will be appreciated that the above described nonlinear crystals may be produced from a bulk crystal by employing one or more known crystal processing techniques. For example, the production of the nonlinear crystals may employ one or more cutting, shaping or polishing processing techniques.

Throughout the specification, unless the context demands otherwise, the term "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An enhancement cavity frequency mixer comprising:
   one or more nonlinear crystals, the one or more nonlinear crystals having a first end face and an opposing second end face, the first and second end faces being separated along an optical axis of the nonlinear crystal by a length in a range of 0.25 mm to 2.5 mm; and
   servo control electronics employed to rotate the one or more nonlinear crystals in response to a wavelength tuning of an input optical field of the enhancement cavity frequency mixer.

2. An enhancement cavity frequency mixer as claimed in claim 1 wherein the first and second end faces are separated along the optical axis of the one or more nonlinear crystals by a length in a range of 0.75 mm to 1.5 mm.

3. An enhancement cavity frequency mixer as claimed in claim 1 wherein the first and second end faces are separated along the optical axis of the one or more nonlinear crystals by a length of 1 mm.

4. An enhancement cavity frequency mixer as claimed in claim 1 wherein the one or more nonlinear crystals comprise a right-angle cut nonlinear crystal.

5. An enhancement cavity frequency mixer as claimed in claim 4 wherein anti-reflective coatings are applied to the first and or second end faces in order to enhance the non-linear operation of the one or more nonlinear crystals.

6. An enhancement cavity frequency mixer as claimed in claim 1 wherein the one or more nonlinear crystals comprise a Brewster-angle cut nonlinear crystal.

7. An enhancement cavity frequency mixer as claimed in claim 1 wherein a height of the one or more nonlinear crystals is in a range of 2 to 8 mm.

8. An enhancement cavity frequency mixer as claimed in claim 1 wherein a width of the one or more nonlinear crystals is in a range of 2 to 8 mm.

9. An enhancement cavity frequency mixer as claimed in claim 1 wherein the one or more nonlinear crystals are formed from BBO (Beta Barium Borate ($BaB_2O_4$)); LBO (Lithium Triborate ($LiB_3O_5$)); Lithium Iodate ($LiIO_3$); Lithium Niobate ($LiNbO_3$); Potassium Niobate ($KNbO_3$); KDP (Monopotassium Phosphate ($KH_2PO_4$)); Gallium Selenide (GaSe); or KTP (Potassium Titanyl Phosphate ($KTiOPO_4$)).

10. An enhancement cavity frequency mixer as claimed in claim 1 wherein the enhancement cavity frequency mixer comprises a ring cavity defined by four or more mirrors.

11. An enhancement cavity frequency mixer as claimed in claim 10 wherein a second mirror of the enhancement cavity frequency mixer comprises a second piezo stack.

12. An enhancement cavity frequency mixer as claimed in claim 11 wherein the servo control electronics controls the second piezo stack to realign the second mirror to compensate for deviation of an output field resulting from the rotation of the one or more nonlinear crystals.

13. An enhancement cavity frequency mixer as claimed in claim 11 wherein the second mirror comprises an input coupler for the enhancement cavity frequency mixer.

14. An enhancement cavity frequency mixer as claimed in claim 1 wherein a first mirror of the enhancement cavity frequency mixer comprises a first piezo stack.

15. An enhancement cavity frequency mixer as claimed in claim 14 wherein the servo control electronics controls the first piezo stack to realign the first mirror to compensate for deviation of an output field resulting from the rotation of the one or more nonlinear crystals.

16. An enhancement cavity frequency mixer as claimed in claim 14 wherein the first mirror comprises an output coupler for the enhancement cavity frequency mixer.

17. An enhancement cavity frequency mixer as claimed in claim 1 wherein the enhancement cavity frequency mixer further comprises a translation stage upon which the one or more nonlinear crystals are located.

18. A method of frequency mixing an input field to an enhancement cavity frequency mixer, the method comprising:
   providing the enhancement cavity frequency mixer with one or more nonlinear crystals, the one or more nonlinear crystals having a first end face and an opposing second end fact, the first and second end faces being separated along an optical axis of the nonlinear crystal by a length in a range of 0.25 mm to 2.5 mm; and
   rotating the one or more nonlinear crystals in response to a wavelength tuning of the input optical field.

19. A method of frequency mixing an input field as claimed in claim 18, wherein the method further comprises realigning a first mirror of the enhancement cavity frequency mixer to compensate for deviation of an output field resulting from the rotation of the one or more nonlinear crystals.

20. A method of frequency mixing an input field as claimed in claim 19, wherein the method further comprises realigning a second mirror of the enhancement cavity frequency mixer to compensate for deviation of an output field resulting from the rotation of the one or more nonlinear crystals.

21. A method of frequency mixing an input field as claimed in claim 18, wherein the method further comprises interchangeably selecting the one or more nonlinear crystals employed to frequency mix the input field to the enhancement cavity frequency mixer.

* * * * *